INVENTORS
WILLIAM H. MILLER
ROBERT F. JONES
ATTORNEYS

Nov. 8, 1960  W. H. MILLER ET AL  2,959,779
PICTORIAL DISPLAY TYPE AIR-NAVIGATION SYSTEM
Filed March 30, 1956  3 Sheets-Sheet 3

INVENTORS
WILLIAM H. MILLER
ROBERT F. JONES
BY
ATTORNEYS

United States Patent Office 2,959,779
Patented Nov. 8, 1960

2,959,779

PICTORIAL DISPLAY TYPE AIR-NAVIGATION SYSTEM

William H. Miller, 609 SW. 18th Ave., Gainesville, Fla., and Robert F. Jones, 8507 Swananoah Road, Dallas 9, Tex.

Filed Mar. 30, 1956, Ser. No. 575,285

1 Claim. (Cl. 343—6)

(Granted under Title 35, U.S. Code (1952), sec. 266)

The invention described herein may be manufactured and used by or for the Government of the United States of America for governmental purposes without the payment of any royalties thereon or therefor.

The present invention relates to a pictorial display type air-navigation system for landing of aircraft during periods of poor visibility.

Existing so-called "blind landing" systems provide, within the aircraft, either oral or visual intelligence which enables the pilot to follow a predetermined flight path in landing, without his visual reference to external objects fixed on the ground. In the prior art system known as G.C.A. (Ground Controlled Approach), radar is employed at the airport for displaying the position of the approaching aircraft on a radar screen. The radar operator verbally directs the pilot of the approaching aircraft by radio while he simultaneously watches the radar screen to observe the movement of the aircraft. Thus, the pilot is "talked" into a safe landing. This system has disadvantages in that it is difficult to blindly follow verbal instructions and also no information is given as to the relative attitude of the airplane with respect to the ground. In the well-known I.L.S. (Instrument Landing System), the pilot is guided, during a landing under poor visibility conditions, entirely by a centering type instrument which he must watch constantly. As he deviates to the left or right, or up or down, from the landing glide path defined by a glide-path beam sent up from the airport by the Instrument Landing System, the instrument moves off center, indicating to the pilot that he must redirect the airplane toward the right or left, or up or down, until the instrument is again centered, when he knows that he is again following the glide path defined by the glide path beam. This is an unnatural way of perceiving the relative orientation of the airplane with respect to the airport and also the information conveyed by the instrument is somewhat inaccurate, since the glide-path beam has definite dimensions and thus the position of the aircraft is not defined with great precision.

In the present invention, a television camera is supported over a scale model of the landing airport and is moved in the same relation to the model airport as the landing airplane moves to the actual airport. The primary objective of the present system is to provide the pilot of the landing airplane with a pictorial display of the airport as it would appear when viewed from the airplane on a clear day. Accordingly, changes in the heading, attitude, and position of the aircraft necessitate corresponding changes in the pictorial display. This requirement is satisfied by operating the television camera as a model aircraft. The position of the landing airplane is determined continuously by ground-based radar; the heading and attitude of the airplane are telemetered to the ground; and the combined position, heading, and attitude data are utilized by servomechanisms to position the camera relative to the model airport in a manner duplicating the relation between the actual aircraft and airport. The image viewed by the television camera is transmitted to the approaching airplane and is displayed on a television screen in front of the pilot. Thus, a pilot can make a relatively natural landing since the continuous pictorial reproduction on the television screen in front of him resembles the airport or surrounding terrain approximately as it would appear to him at the same time under normally visible ambient conditions. In this system the pilot maintains at all times full control of his airplane and effects his landing in a natural manner without having to follow either a predetermined path, or oral instructions from a control station on the ground during the landing approach. It also avoids the technical difficulties associated with the development of a visual landing system involving the illumination of the airport from a radiation source within the airplane, in order to provide the necessary optical intelligence.

Accordingly, an object of the present invention is the provision of a blind landing system.

Another object is to provide a blind-landing system in which landing information is conveyed by visual means.

A further object of the invention is the provision of a visual, blind-landing system in which a display of a reproduction of the landing airport is presented before the pilot of an approaching aircraft.

Still another object is to provide a visual, blind-landing system in which a display of a reproduction of the landing airport is presented before the pilot of an approaching aircraft in a manner such that the display resembles the airport and surrounding terrain approximately as it would appear to the pilot under normally visible ambient conditions.

Other objects and many of the attendant advantages of this invention will be readily appreciated as the same becomes better understood by reference to the following detailed description when considered in connection with the accompanying drawings wherein.

Figure 1:
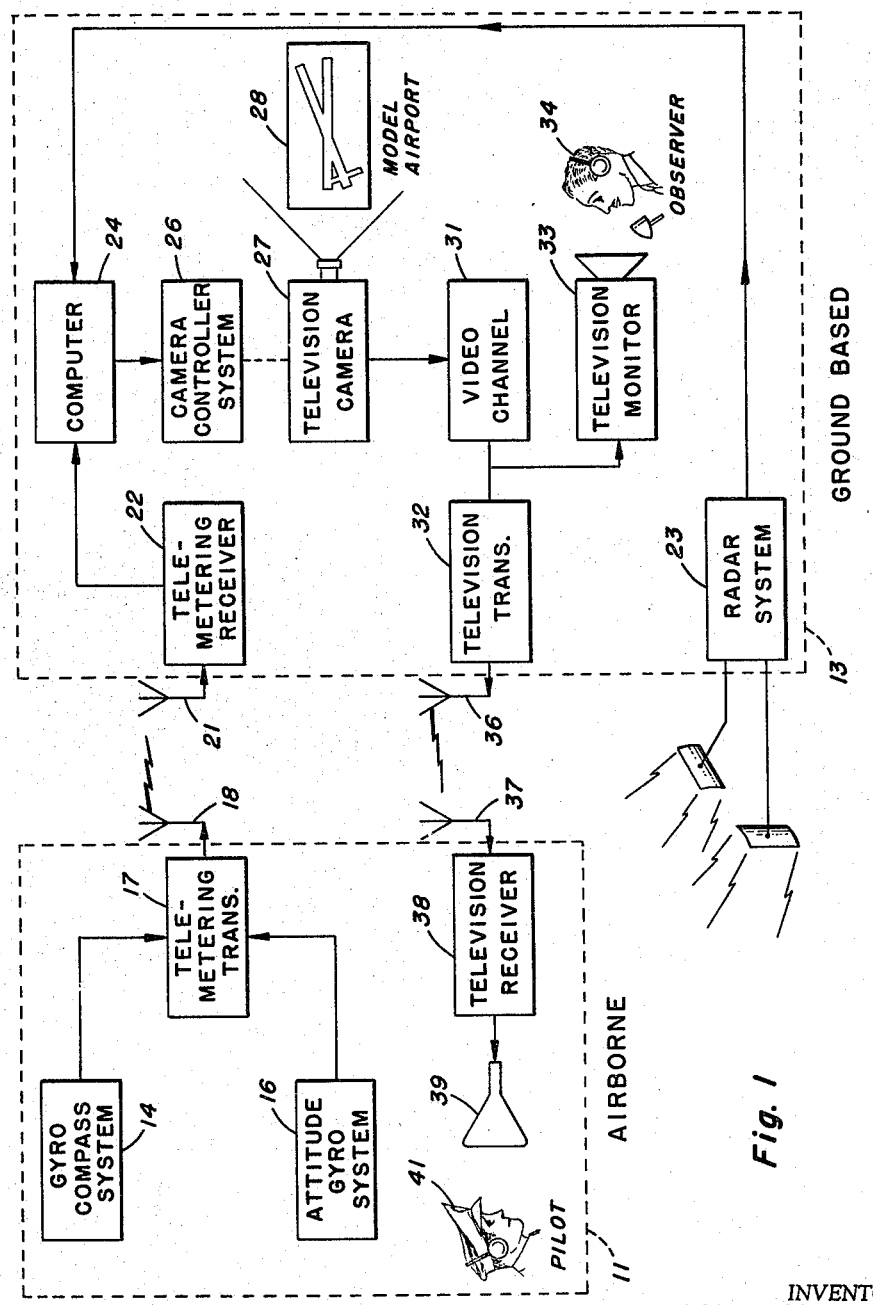
Fig. 1 shows a block diagram of a preferred embodiment of the present invention.

Referring now to the drawings, wherein like reference characters designate like or corresponding parts throughout the several views, there is shown in Fig. 1 (which illustrates a preferred embodiment) an airborne section 11 of the present invention which is carried by the airplane approaching the landing airport and a ground based section 13 which is situated at the landing airport. In the airborne section 11 there is a gyro compass system 14 which produces an output electrical signal that is a function of the heading of the approaching aircraft and an attitude gyro system 16 that produces two electrical outputs, one of which is a function of the pitch of the approaching airplane and the other of which is a function of the degree of roll of this airplane. The outputs from the gyro compass and attitude gyro systems are conducted to the telemetering transmitter 17 which transmits via antenna 18 an electromagnetic wave which has impressed thereon, preferably in the form of modulation, intelligence as to the heading, pitch, and degree of roll of the approaching aircraft. This electromagnetic wave is detected by antenna 21 at the landing airport and is demodulated and amplified in the telemetering receiver 22 which produces three output signals having the roll, pitch, and heading information, respectively, of the approaching airplane.

At the airport a radar system 23 detects the position of the approaching airplane and produces three signals which are functions of the distance, elevation, and azimuth, respectively, of the airplane. These signals, with the signals from receiver 22, are fed to a computer 24 which converts the input signals into output signals having the proper characteristics to energize camera controller system 26 to position the television camera 27 with respect to the scale model 28 of the airport as the approaching airplane is positioned with respect to the landing airport. The scene viewed by television camera 27 is converted into electrical signals that are processed by video channel 31 and then fed to television transmitter 32 and television monitor 33, the latter of which produces a display that can be seen by an observer 34. The television signal is transmitted via antenna 36 to antenna 37 on the approaching aircraft and then is processed in television receiver 38 and finally produces a display on the screen of cathode ray tube 39 which can be viewed by pilot 41. This display is the scale model airport as viewed by television camera 27, and since this camera is positioned with respect to the scale model airport 28 as the approaching airplane is positioned with respect to the landing airport, the pilot 41 has a visual reproduction of his position with respect to the landing airport. Of course, as the airplane moves, this visual reproduction will change so that it is at all times a true representation of the landing airport as the pilot would see the actual landing airport if there were ideal visibility conditions.

Figure 2:
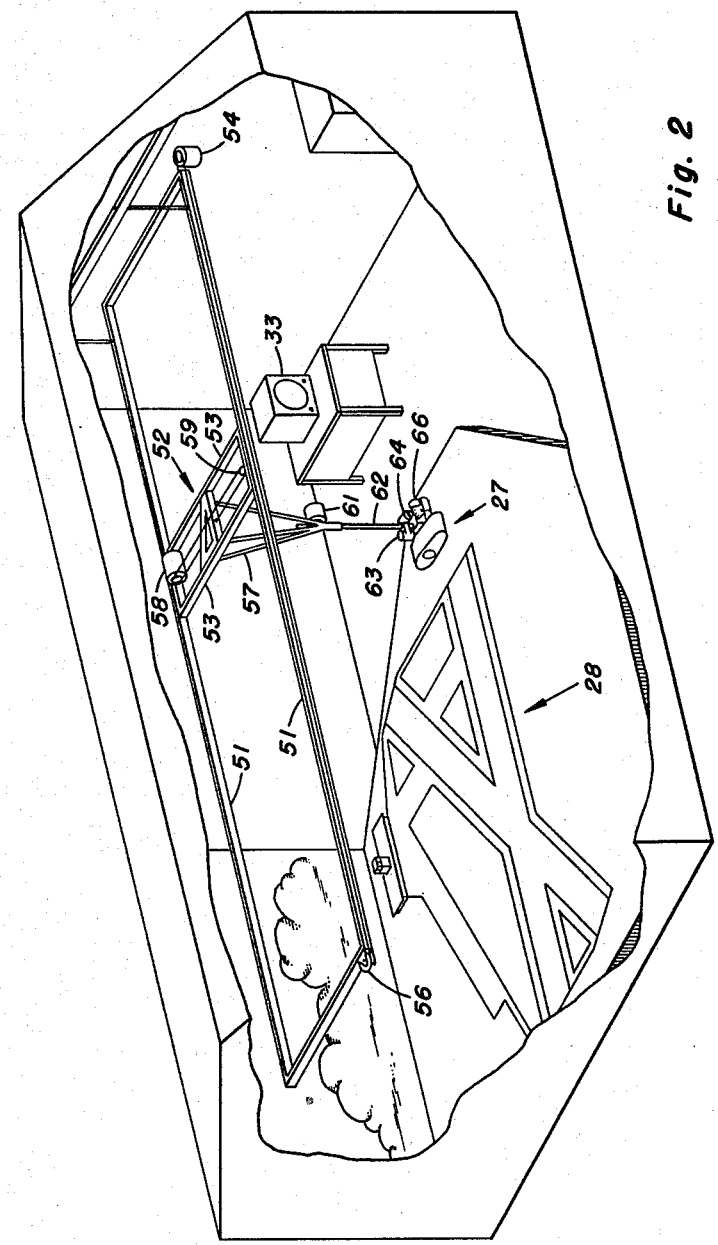
Fig. 2 illustrates the portion of the present system that is situated at the landing airport.

The camera controller system and the scale model airport are shown in Fig. 2. A range rail system having parallel rails 51 extends over the scale model 28, and riding on the rails 51 is a frame 52 which has azimuth rails 53 thereon. A range servomotor 54 operates through pulley system 56 to position frame 52 at a distance from scale model 28 corresponding to the distance the approaching airplane is from the landing airport. A camera supporting system 57 rides on azimuth rails 53 and is driven by servomotor 58 and pulley system 59 so that the azimuth position of camera 27 relative to the scale model 28 is the same as the azimuth position of the approaching aircraft is to the landing airport. An elevation servomotor 61 mounted on camera supporting system 57 drives shaft 62 to make the elevation position of camera 27 relative to scale model 28 correspond to the actual elevation of the approaching aircraft. The heading servomotor 63, the pitch servomotor 64, and the roll servomotor 66, position camera 27 so that the heading, pitch, and roll of this camera are identical to that of the approaching airplane.

Figure 3:
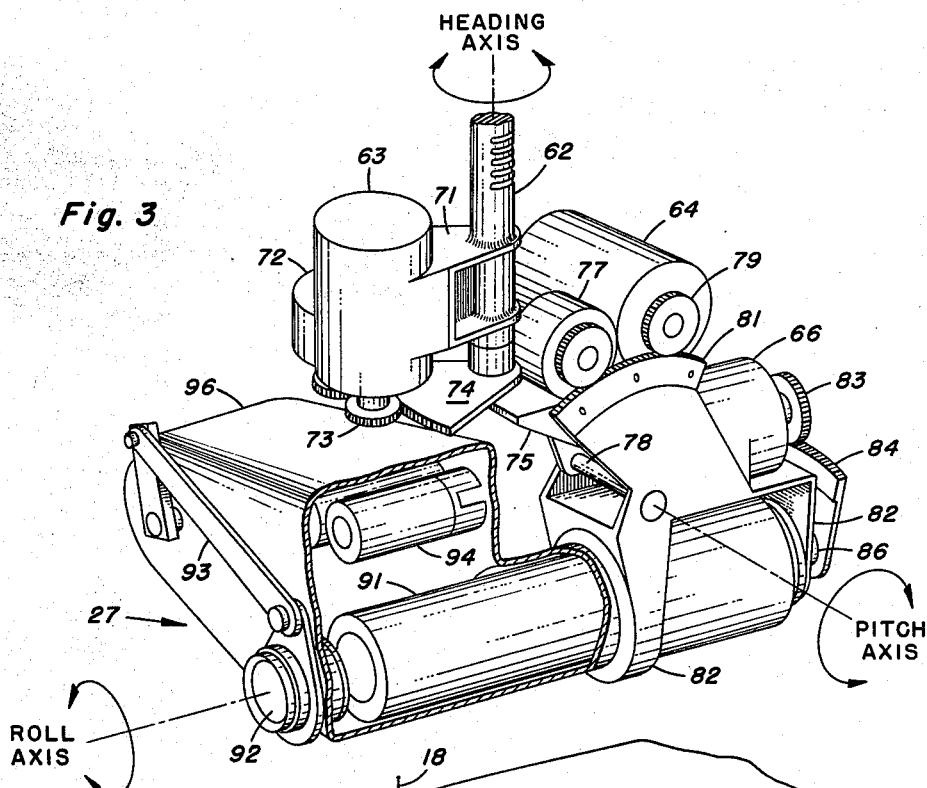
Fig. 3 is a perspective view, partly in section, of the television camera and associated control motors.

The system components that are in the immediate vicinity of camera 27 are shown in Fig. 3. Heading servomotor 63 and heading follow-up servomotor 72 are secured to shaft 62 by bracket 71, or the like, and heading rotation of camera 27 is obtained by means of the action of the driving gear 73 of heading servomotor 63 on segment gear 74, which rotates about shaft 62. Attached to gear 74 is a platform 75 upon which are positioned pitch servomotor 64 and pitch follow-up servomotor 77. An axle 78 is located in platform 75 and pitch rotation of camera 27 is obtained about this axle by means of the action of driving gear 79 upon segment gear 81. Gear 81 is a part of a bearing flange arrangement 82 in which the television camera 27 is rotated to provide roll. Roll servomotor 66 is mounted on bearing flange arrangement 82 and has a driving gear 83 which meshes with segment gear 84 to provide roll for camera 27. A roll follow-up servomotor (not shown) also meshes with gear 84. Gear 84 is joined to camera 27 by shaft 86 which is rotatably mounted in bearing flange arrangement 82. The television camera 27 has a camera tube 91 and a lens system 92, the latter of which is focused through operation of lens adjustment linkage 93. The television camera components, including electronic tube 94, are enclosed in a casing 96.

Figure 4:
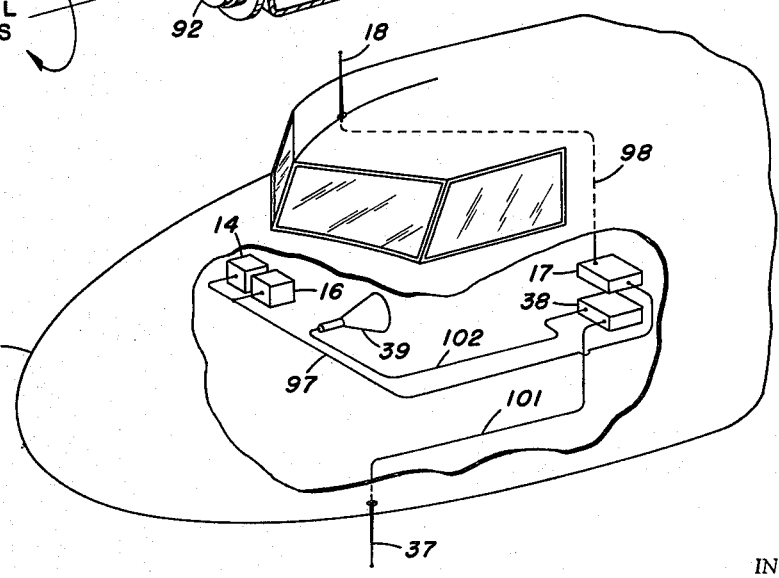
Fig. 4 illustrates the portion of the present system that is situated on the approaching aircraft.

One possible mounting system for the airborne equipment of the approaching aircraft 96 is shown in Fig. 4.

The gyro compass system 14 and the attitude gyro system 16 are situated side-by-side and are joined by a common cable 97 to telemetering transmitter 17 which is connected by cable 98 to telemetering antenna 18 which is positioned atop the airplane cabin. On the underside of the aircraft 96, television antenna 37 receives the television signals from the airport, and these signals are conducted to television receiver 38 by cable 101. The video output from receiver 38 is transmitted via cable 102 to the cathode ray tube 39 which is situated such that the pilot of airplane 96 can see the display thereon. Of course there are many other mounting systems that would be equally suitable.

None of the system components have been shown in detail since there are well-known circuits for performing each of the component functions. Gyro systems that provide electrical outputs have been used for many years and quite often consist only of a gyro element that is joined to the arm of a potentiometer. The SCR-584 Radar which is described in the November 1945, December 1945, and February 1946 issues of Electronics, McGraw-Hill, New York, could be utilized as radar system 23, although there are other radar systems equally suitable. Of course, components suitable for the transmitters and receivers and the video equipment are quite well known and require no explanation. The computer 24 can consist only of six amplifiers, one for each input signal, which convert the input signals into output signals having the proper characteristics to operate the respective servomotors so that the servomotor outputs will be the desired function of the movement of the approaching airplane. The design of the amplifiers can follow conventional procedures and will depend upon the characteristics of the servomotors, the transmitters and receivers, and the size of the scale model airport. If the computer 24 consists of only six amplifiers there will be an error introduced into the azimuth movement of camera 27 along azimuth rails 53 upon response to the azimuth signal from radar system 23. This is due to the azimuth rails 53 being a cartesian coordinate and the azimuth signal representing the angle of a polar coordinate system. This error will be negligible for all practical purposes since the range of operation of camera 27 along azimuth rails 53 is confined to a feasible approach area of the aircraft in relation to the runway in question. However, if it is desired to eliminate this error a well known polar to rectangular coordinate converting system can be employed in computer 24 such as is shown in the patent to Agins, No. 2,465,624, dated March 29, 1949 and Fig. 5 of "Electrical Resolvers," Electrical Manufacturing, March 1953, page 131.

In the operation of the present system, when the landing airplane approaches within range of radar system 23, the latter automatically causes the camera 27 to move rapidly into its correct position relative to the model airport 28. As soon as the purely translational movements of the landing airplane and the television camera 27 have been synchronized by radar system 23 and camera controller system 26, the pilot communicates his altitude and bearing to the model airport control room where an observer 34 checks this information against the indicated position of camera 27 relative to model airport 28. Then, on signal, the pilot causes telemetering transmitter 17 to be energized and he "takes-over" complete control of camera 27 which communicates to him via television transmitter 32 and television receiver 38 an approximate picture of the airport during the landing maneuver.

It is to be noted that in the present system, the pilot of the landing airplane actually determines the flight path and corresponding airport picture during landing approach. Thus, a more natural landing can be made than with other so-called "blind landing" systems, but of course the pilot may choose to execute the major part of the landing maneuver with the additional assistance of his flight instruments.

There are many possible variations of this system which are all within the scope of the present invention. For example, it is possible to televise the model airport through a microscopic lens, in which case the model airport could be constructed to almost any convenient scale, and could, if necessary, be moved, relative to the earth and the television camera could remain fixed. Also, the model airport 28 and the television camera 27 and the camera controller system 26 can be replaced by a computer. The instantaneous linear and angular co-ordinates of the airplane in space then would be fed into this computer from the tracking radar on the ground with the telemetered values of roll, pitch, and heading obtained by the airborne equipment. Having received this data and a predetermined set of "optical" equations, the computer would then "calculate" and transmit a simplified picture of the airport to the television receiver in the airplane.

Obviously many modifications and variations of the present invention are possible in the light of the above teachings. It is therefore to be understood that within the scope of the appended claims the invention may be practiced otherwise than as specifically described.

What is claimed is:

A system for enabling the pliot of an aircraft to make a relatively natural landing under conditions of zero visibility, wherein a continuous pictorial reproduction of the airport at which the landing is to be made is displayed to the pilot approximately as it would appear to him if he were landing under normally visible ambient conditions, said system comprising: a scale model of the airport; a television camera; a range rail system having rails extending over said scale model; a frame adapted for movement along said range rails and having azimuth rails supported thereon; a range servomotor and pulley system for moving said frame along said range rails in response to an input range signal that is a function of the range of said aircraft so that the position of said frame from said scale model corresponds to the range of said aircraft from said airport; a camera supporting system adapted for movement along said azimuth rails and for supporting said television camera; an azimuth servomotor and pulley system for moving said camera supporting system along said azimuth rails in response to an input azimuth signal that is a function of the azimuth of said aircraft so that the position of said camera supporting system from said scale model corresponds to the azimuth of said aircraft from said airport; an elevation servomotor system mounted on said camera supporting system for moving said television camera in an elevation direction in response to an input elevation signal that is a function of the elevation of said aircraft so that the position of said television camera corresponds to the elevation of said aircraft; a pitch servomotor system mounted on said camera supporting system for providing pitch to said television camera in response to an input pitch signal that is a function of the pitch of said aircraft so that the pitch of said television camera is identical to the pitch of said aircraft; a heading servomotor system mounted on said camera supporting system for providing heading to said television camera in response to an input heading signal that is a function of the heading of said aircraft so that the heading of said television camera is identical to the heading of said aircraft; a roll servomotor system mounted on said camera supporting system for providing roll to said television camera in response to an input roll signal that is a function of the roll of said aircraft so that the roll of said television camera is identical to the roll of said aircraft; a radar system for producing range, azimuth, and elevation signals that are functions, respectively, of the range, azimuth and elevation of said aircraft; an attitude gyro system adapted to be mounted on said aircraft for producing two output electrical signals, one of which is a function of the roll of the aircraft and the other of which is a function of the pitch of said aircraft; a gyro compass system adapted to be mounted on said aircraft for producing an output electrical signal that is a function of the heading of said aircraft; a telemetering transmitter system adapted to be mounted on said aircraft and having inputs connected to the outputs of said attitude gyro system and said gyro compass system for transmitting signals to said airport whose characteristics are functions of the roll, pitch, and heading of said aircraft; a telemetering receiver system adapted to be located at the airport for demodulating and amplifying the received signals from said telemetering transmitter system and for producing roll, pitch, and heading output signals that are functions, respectively, of the roll, pitch, and heading of said aircraft; a computer system for converting the roll, pitch, and heading signals from said telemetering receiver system and the range, azimuth and elevation signals from said radar system into electrical signals having characteristics suitable for operation of the respective servomotors, and for conducting the converted electrical signals to the respective servomotors, whereby the picture of said scale model of said airport viewed by said television camera for any position of said aircraft in the vicinity of the airport is substantially the same view the pilot would have of the actual airport from the same position on a day when visibility conditions were ideal; a television transmitter for transmitting the picture of said scale model viewed by said television camera; and a television receiver adapted for mounting on said aircraft for receiving the radiated signal from said television transmitter, and for displaying the image of said scale model viewed by said television camera.

References Cited in the file of this patent

UNITED STATES PATENTS 2,027,530     Hammond               Jan. 14, 1936

FOREIGN PATENTS 157,494      Australia                Sept. 25, 1952